United States Patent [19]

Cato et al.

[11] Patent Number: 4,548,463

[45] Date of Patent: Oct. 22, 1985

[54] HOLOGRAPHIC SCANNER CONTROL BASED ON MONITORED DIFFRACTION EFFICIENCY

[75] Inventors: Robert T. Cato; LeRoy D. Dickson, both of Raleigh; Olen L. Stokes, Jr., Cary, all of N.C.

[73] Assignee: International Business Machines Corporation, Armonk, N.Y.

[21] Appl. No.: 579,635

[22] Filed: Feb. 13, 1984

[51] Int. Cl.$^4$ .................... G02B 5/32; G02B 27/17
[52] U.S. Cl. .................... 350/3.71; 350/6.5; 350/6.8; 235/454; 235/457
[58] Field of Search ........... 350/3.71, 6.2, 6.3, 350/6.5, 6.7, 6.8; 235/454, 455, 457

[56] References Cited

U.S. PATENT DOCUMENTS 4,270,131  5/1981  Tompkins et al. ................ 350/6.8

FOREIGN PATENT DOCUMENTS 57-82814  5/1982  Japan ........................... 350/6.5

OTHER PUBLICATIONS

E. C. Broockman, "Holographic Scanning Disc with Auxiliary Data Track", *IBM Technical Disclosure Bulletin,* vol. 25, #3B, Aug. 1982, p. 1599.

E. C. Broockman, "Performance-Sensitive Gain-Adjustment Routine for Checkout Scanner", *IBM Technical Disclosure Bulletin,* vol. 24; #9, Feb. 1982, pp. 4844–4846.

*Primary Examiner*—John K. Corbin
*Assistant Examiner*—William Propp
*Attorney, Agent, or Firm*—Gerald R. Woods

[57] ABSTRACT

Operating parameters for a multiple facet holographic disc scanner are adjusted on real time basis as a function of the actual diffraction efficiency of the facet region aligned with the impinging laser beam. The operating parameters are adjusted to achieve optimum signal levels independent of facet characteristics. Diffraction efficiency is inversely related to zero order beam power for a given level of input beam power. A photodetector measures the zero order beam power. The output of this photodetector is used to control video amplifier gain and/or semiconductor laser current.

14 Claims, 7 Drawing Figures

HOLOGRAPHIC SCANNER CONTROL BASED ON MONITORED DIFFRACTION EFFICIENCY

BACKGROUND OF THE INVENTION

The present invention relates to optical scanners and more particularly to a multiple facet holographic disk scanner having parameters which are controlled, at least in part, on a real time basis as a function of facet diffraction efficiency.

Optical scanners of the type commonly employed in supermarkets include a laser light source and an optical system which re-directs light from the source along predetermined scan lines to produce a scan pattern above the scanner suitable for detecting bar coded labels on products passing over the scanner. The optical system typically includes a rotating component in the path of the laser beam for causing the laser beam to be deflected along arcuate scan lines, which may be folded or further shaped by a set of fixed mirrors to produce the actual scan pattern.

In one known type of scanner, the rotating component is a glass disk which carries a number of sector-shaped holographic facets. Each of the facets may be characterized as an optically generated diffraction grating which bends or diffracts an impinging laser beam along a predetermined path. Each of the facets may be constructed using conventional holographic techniques by aiming two beams of coherent light at an unexposed sheet of photosensitive material, such as silver halide film or dichromated gelatin film. Where the two beams overlap, interference patterns are recorded in the photosensitive film. The films are developed by similarly conventional techniques suitable for the particular film material employed.

Multiple facet holographic disks have advantages over rotating mirror wheels of the type commonly known in the prior art. The holographic disks are considered to be cheaper and easier to build. Also, a scan pattern can be changed without significant difficulty simply by changing one or more facets on the disk.

While multiple facet holographic disks have these and other advantages, they also have certain drawbacks. Because of the nature of the optical processes by which the facets are made, some facets are more efficient at diffracting or bending impinging light rays than other facets. For example, one facet may bend or diffract 65% of the impinging light, another facet may diffract only 45% of the impinging light. In both of these cases, most of the remaining light will continue on through the holographic facet in a straight line path, with a small portion being scattered, absorbed or reflected by the holographic medium or its substrate. Conventional lasers are fixed power devices which provide an output beam having substantially a constant power level. Changes in diffraction efficiency from facet to facet produce changes in the power level of the diffracted beam from facet to facet.

Since the amount of light returned from an object is at least partially dependent on the power level of the light initially impinging on the object, the power level of returned signals can fluctuate widely due to facet to facet changes in diffraction efficiency. If the returned signal fluctuates too much, it will be distorted by electronic signal processing circuitry needed to detect and decode labels on the products being scanned. The distortion may prevent the label from being successfuly read and, in some instances, may cause the label to be incorrectly read.

While the preceding material addresses only facet to facet variations in diffraction efficiency, the fact is that diffraction efficiency also varies within a facet as well. Changes in diffraction efficiency within a facet cause the same sorts of problems as facet to facet changes.

The problems caused by nonuniform diffraction efficiencies in holographic scanner disks have been recognized. Various attempts have been made to solve these problems. In one known type of scanner, the gain factor for the electronic signal processing circuitry is set at a level dependent upon an average diffraction efficiency value obtained by statistically sampling a number of holographic disks to be used in the scanners. Obviously, this approach does not consider variations in diffraction efficiency from disk to disk, from facet to facet within a disk, or within individual facets.

Another proposed partial solution to the problem of nonuniform diffraction efficiency calls for the placement of an auxiliary track on each holographic disk. The track which might be read by a separate optical read head or by a magnetic head could include diffraction efficiency values for specific facets on the holographic disk. The auxiliary track would not include any diffraction efficiency information for most of the facets on the disk. Moreover, the proposal does not provide any suggestion for solving the problem of variations in diffraction efficiency within a given facet.

Another approach to the problem of nonuniform diffraction efficiency calls for the gain of the signal processing circuitry to be adjusted to maximize the percentage of labels which are correctly read on the first pass. The gain adjustment is indirectly influenced by disk diffraction efficiency but does not actually provide compensation for facet to facet variations or intra-facet variations in diffraction efficiency.

SUMMARY OF THE INVENTION

The present invention is an optical scanner in which the actual diffraction efficiency of the active region of a holographic facet is monitored on a real time basis and used to adjust one or more operating parameters. The adjustment in operating parameters may be used to maintain a constant power output beam and/or to limit variations in returned signal strength so that electronic signal processing circuitry can operate within its designed dynamic or distortion-free range.

The scanner is of the type that includes a coherent light source and a rotating beam-deflecting component with a plurality of contiguous holographic optical elements for deflecting the coherent light beam along predetermined scan lines. The scanner controller comprises means for monitoring the diffraction efficiency of each holographic optical element in the region currently aligned with the coherent light beam produced by the source. Means are included for adjusting one or more scanner operating parameters as a function of changes in the monitored diffraction efficiency.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL DESCRIPTION

Figure 1:
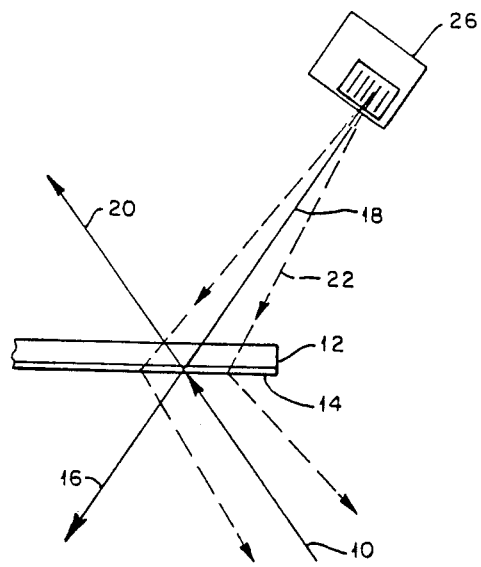
FIG. 1 is a partial cross sectional view of a holographic disk showing various light beams to be defined.

The following technical description refers repeatedly to different light beams which are produced during the normal operation of a multiple facet holographic disk scanner. These beams are defined with reference to FIG. 1. Input beam 10 is a collimated, coherent light beam produced by a laser light source. When input beam 10 is directed at a holographic film 12 on the bottom surface of a glass disk 14, the beam energy is split into a number of components. A small amount of beam energy is reflected from the surface of holographic film 12 to produce a reflected beam 16. If the holographic film 12 has a high diffraction efficiency, 60% or more of the beam energy is diffracted along a path determined by the hologram characteristics. This diffracted beam 18 is referred to as the first order beam. A smaller but still significant amount of beam energy passes through the holographic film 12 and glass disk 14 without being diffracted or significantly refracted. This beam, which is basically an extension of the input beam 10, is referred to as zero order beam 20.

When first order beam 18 strikes a product 26 being moved through the scanner's field of view, light is generally diffusely reflected from the object. A portion of this diffusely reflected light, referred to as return beam 22, returns to the scanner along a generally cone-shaped diverging path.

Although not shown in the drawing, return beam 22 is split into a zero order and a first order component when it passes through holographic film 12 on the return path. The first order component is diffracted along a path substantially centered on the path of input beam 10 while the zero order component continues along a path which is generally coaxial with the path of beam 18. Further the drawing does not illustrate the reflection or refraction of light that occurs at other interfaces, such as the interface between the upper surface of holographic film 12 and the lower surface of glass disk 14. The amounts of optical energy redirected at these interfaces are small and can generally be neglected for purposes of the present invention.

Figure 2:
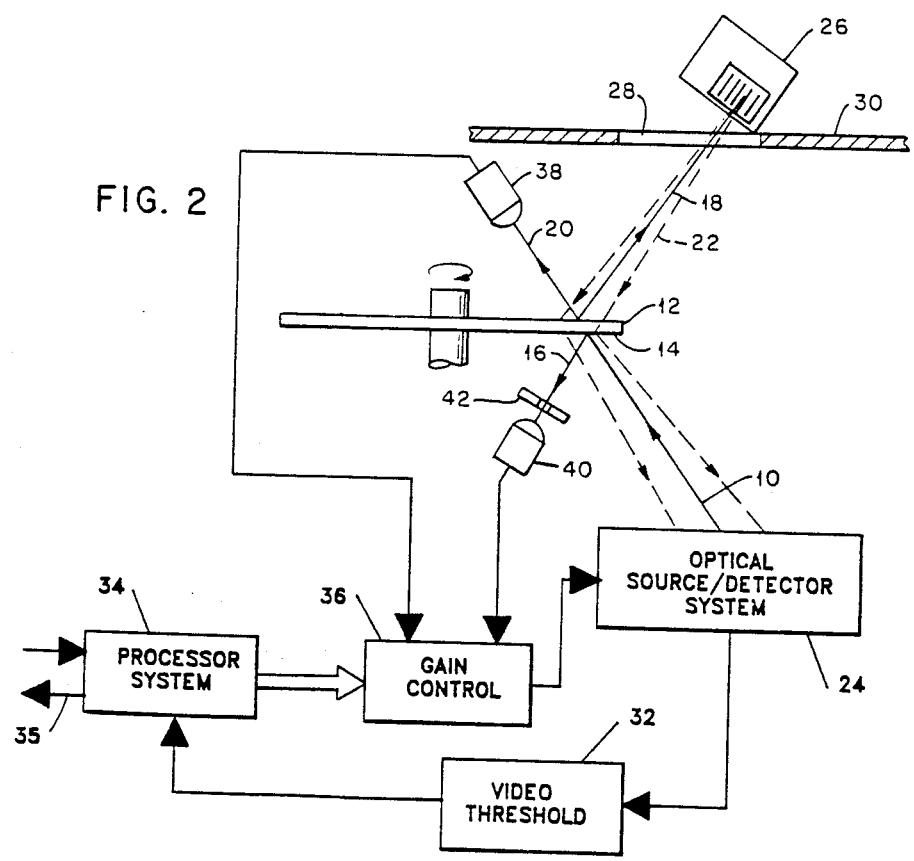
FIG. 2 is a general block diagram describing what might be referred to as a generic version of a scanner constructed in accordance with the present invention.

FIG. 2 is a block diagram of what might be considered a generic form of the invention. Input beam 10 is generated within a system identified as an optical source/detector system 24. System 24 produces the input beam 10 and processes the return beam 22 to produce an electrical signal which varies in accordance with the amount of light reflected from a label on a product 26 being scanned as it moves over a transparent window 28 in the top surface of a scanner enclosure. The electrical signal produced by system 24 is applied to a video threshold circuit 32 which compares the irregular or analog signal to threshold levels to produce a square wave signal in which the width of each pulse is determined by the width of light or dark areas on the product being scanned.

The output of video threshold circuit 32 is applied to a processor system 34. The processor system 34 selects label candidates from the input signal stream and decodes those candidates to establish the numeric representation of the bar coded label carried by product 26. The numeric representation is transferred to other components in the point of sale system through an output bus 35.

The processor system 34 may also provide an input to a gain control circuit 36 which controls the gain factor for one or more components in the optical source/detector system 24. The gain is also at least a partial function of the monitored diffraction efficiency of the active region of holographic film 12, which is the region aligned with input beam 10 at a given time. To monitor the diffraction efficiency, a photodetector 38 is aligned with the zero order beam 20. For a given level of input beam power, changes in the power level of zero order beam 20, as detected by the photodetector 38, are indicative of changes in the diffraction efficiency of the active region of holographic film 12. An increase in the zero order beam power level indicates a reduced diffraction efficiency, which yields a lower first order beam power level. The signals produced by photodetector 38 are employed by gain control circuit 36 to adjust the gain of system 24 so as to offset or compensate for changes in diffraction efficiency. For a particular embodiment of the invention, the input beam strength is monitored by a photodetector 40 located in the path of the reflected beam 16. A spatial filter 42 prevents any light other than that in reflected beam 16 from reaching photodetector 40.

Figure 3:
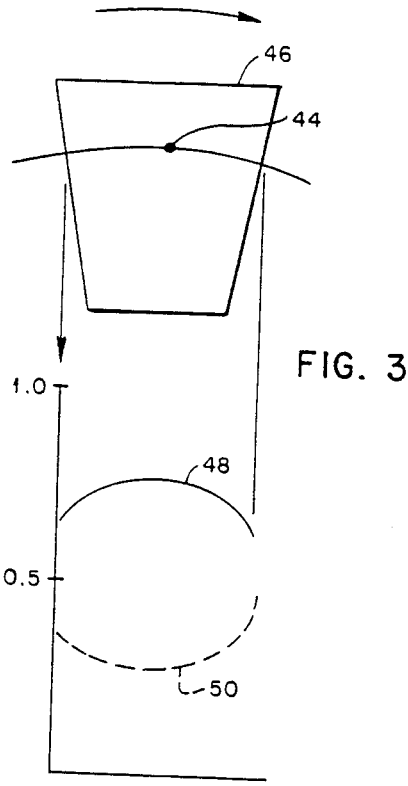
FIG. 3 is a plan view of a holographic facet showing a typical variation in diffraction efficiency across the width of the facet.

FIG. 3 is a plan view of a single holographic facet of the type which would be mounted on the underside of glass disk 14. Input beam 10 is incident on the underside of the disk 14 at the same physical point 44 relative to the center of the disk at all times. As the disk 14 rotates, different regions of the facet 46 are brought into alignment with the point 44 of incidence of the input beam. The region of facet 46 in alignment with point 44 at any given time is referred to as the active region of the facet.

Typically, the diffraction efficiency of a holographic facet will be lowest at the edges of the facet and highest somewhere near the middle of the facet. This is illustrated by curve 48 which is presented on a normalized scale on which the 1.0 level represents the sum of the combined power in the zero and first order beams. If the power level for the input beam is fixed, curve 48 also represents the relative magnitude of the first order beam 18 at points across the width of the facet. Curve 50 represents the power level for the zero order beam 20 given the diffraction efficiency curve 48. Since the magnitude of first order beam 18 is dependent upon the diffraction efficiency at a given point on the curve, the magnitude of return beam 22 is also dependent on the diffraction efficiency. The diffraction efficiency has a cumulative effect for that portion of the return beam which actually reaches the detection portion of the optical source/detection system 24 since the return beam 22 must pass through the holographic facet on its way to the detector. Thus, variations in the return beam level are magnified.

Figure 4:
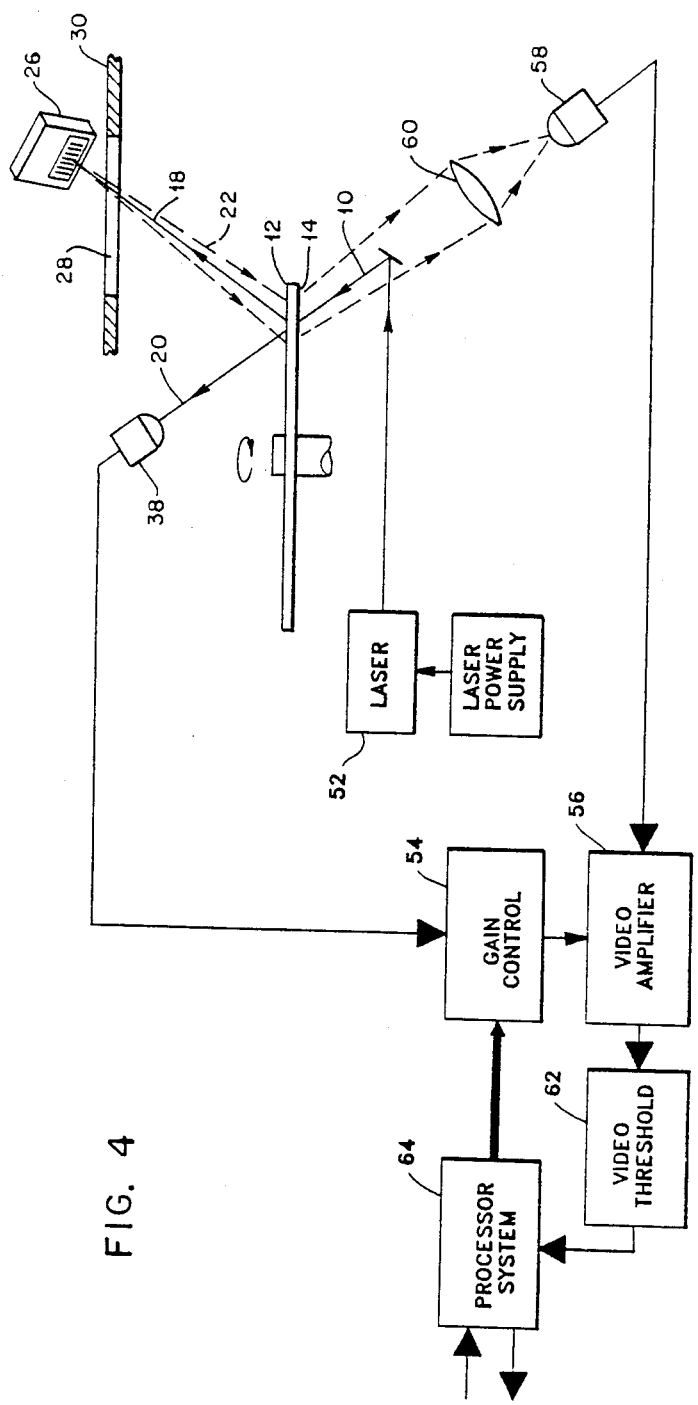
FIG. 4 is a block diagram of a scanner in which amplifier gain is adjusted as a function of diffraction efficiency.
Figure 5:
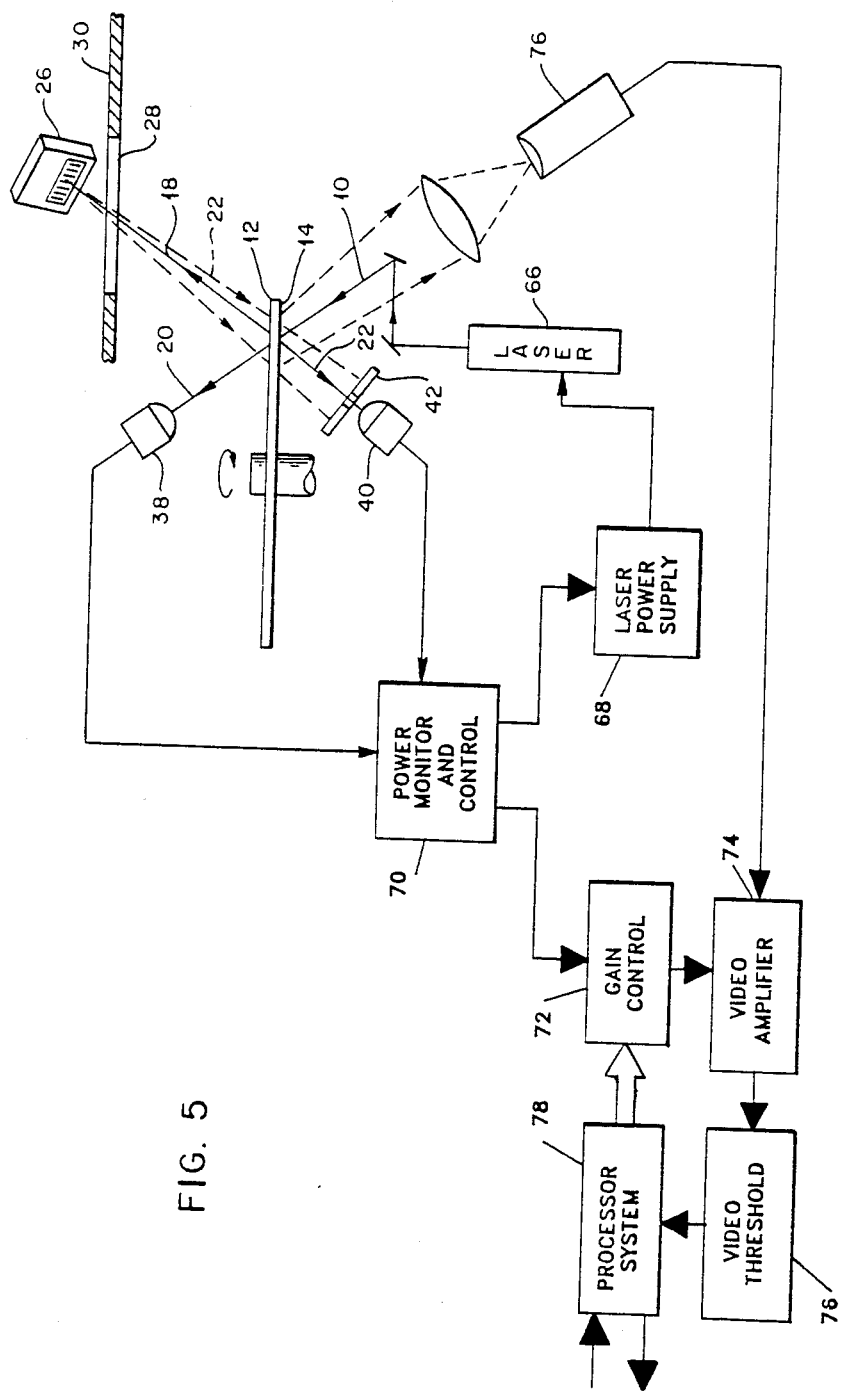
FIG. 5 is a block diagram of an alternate embodiment in which laser drive current and amplifier gain are both adjusted as a function of monitored diffraction efficiency.

Two different embodiments of the invention are illustrated in FIGS. 4 and 5. In one embodiment, the gain factor for the signal processing circuitry is adjusted as a function of monitored diffraction efficiency. In the other embodiment, drive current for the laser is adjusted as well as the gain of the signal processing circuitry. Referring first to FIG. 4, the type of laser most commonly employed is a gas laser 52 which produces a nominally constant power beam 10. The output power level of such a laser cannot be readily varied. In the system disclosed in FIG. 4, the zero order beam 20 is monitored by photodetector 38 which provides an input signal to a gain control circuit 54. The gain control circuit 54 adjusts the gain factor for a video amplifier 56 which receives an output signal from a photodetector or photodiode 58 which detects that portion of the return beam 22 which is diffracted by holographic film 12. A conventional condensing lens 60 may be used to focus the diffracted component of return beam 22 onto photodetector 58.

If the diffraction efficiency in the active region of the holographic film 14 increases, the power levels of first order beam 18 and the return beam 22 will increase, causing the output from photodetector 58 to increase. To offset the increased signal level, the gain of the video amplifier 56 is reduced proportionally so that the video amplifier output remains within a predefined range of values. The video amplifier output is applied to a video thresholding circuit 62 of the type described earlier. The thresholding signal is applied to a processor system 64 in which candidate select and decode operations are performed.

As is well known, processor system 64 may monitor the ratio of good to bad scans to establish a scanner performance level. A relatively long term adjustment in the system gain may be performed in an effort to maximize this ratio.

FIG. 4 shows a photodiode 58 and a separate video amplifier 56. A photomultiplier tube may be used in place of the photodiode 58, eliminating any need for a gain controlled video amplifier. In such a case, the output of gain control circuit 54 would be applied directly to the photomultiplier tube to adjust the tube gain.

Referring to FIG. 5, semiconductor lasers such as laser 66 are solid state devices which can produce a variable power beam 10 as a function of the level of drive current supplied by a laser power supply circuit 68. Since the beam 10 produced by semiconductor laser 66 has a variable output power level, the diffraction efficiency of the active region of the holographic film 12 can be determined only by measuring the strength of the zero order beam 20 at a photodetector 38 as well as the strength of the reflected beam 22 at a photodetector 40 and comparing these two values. A spatial filter 42 assures that photodetector 40 is responsive only to beam 22. Once the power of beam 10 is determined by measurement of reflected beam 22, a power monitor/control system 70 can determine the diffraction efficiency of the active region on the basis of the signal provided by photodetector 38. The system 70 provides two different scanner-controlling signals. One signal is apllied to the power supply circuit 68 for the laser 66. This signal changes the drive current supplied to laser 66 as a generally inverse function of the monitored diffraction efficiency. If the diffraction efficiency decreases, the amount of power supplied to the laser is increased to provide a relatively constant power first order beam 18.

The control system 70 also provides a control signal for a gain control circuit 72 which drives a video amplifier 74. The adjustments in gain of amplifier 74 compensate for changes in the power level of the returned signal attributable to changes in the diffraction efficiency in the active region. The output of the amplifier 74 is applied through a thresholding circuit 76 to the processor 78. In this instance, the threshold circuit 76 and the processor system 78 serve generally the same functions as were described above with reference to the system shown in FIG. 4.

Figure 6:
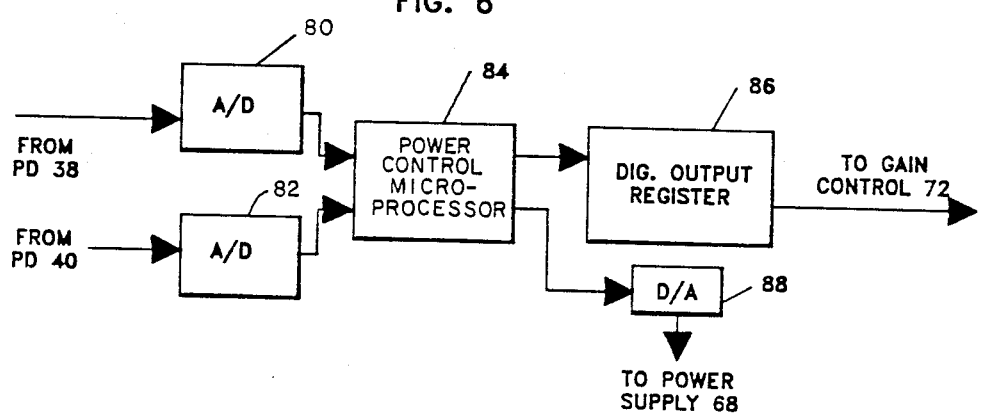
FIG. 6 is a more detailed block diagram of a power monitor and control system used within the system illustrated in FIG. 5.

FIG. 6 is a more detailed block diagram of the power monitor/control system 70. The analog signal generated by photodetector 38, representing the zero order beam power, is digitized in an analog to digital converter 80. Similarly, the analog signal from photodetector 40, representing the input beam power, is digitized in an analog to digital converter 82. Both digitized signals are applied to a programmed power control microprocessor 84. Microprocessor 84 generates two control signals based on these inputs. The first control signal is a gain adjustment signal which is supplied through a digital output register 86 to the gain control circuit 72. The gain of the video amplifier 74 is incremented or decremented as an inverse function of the changes in monitored diffraction efficiency at the given level of input beam power. The second control signal is applied through a digital to analog converter 88 to the laser power supply 68 for the laser 66. This control signal causes the laser drive current to be increased or decreased as an inverse function of the monitored diffraction efficiency.

Figure 7:
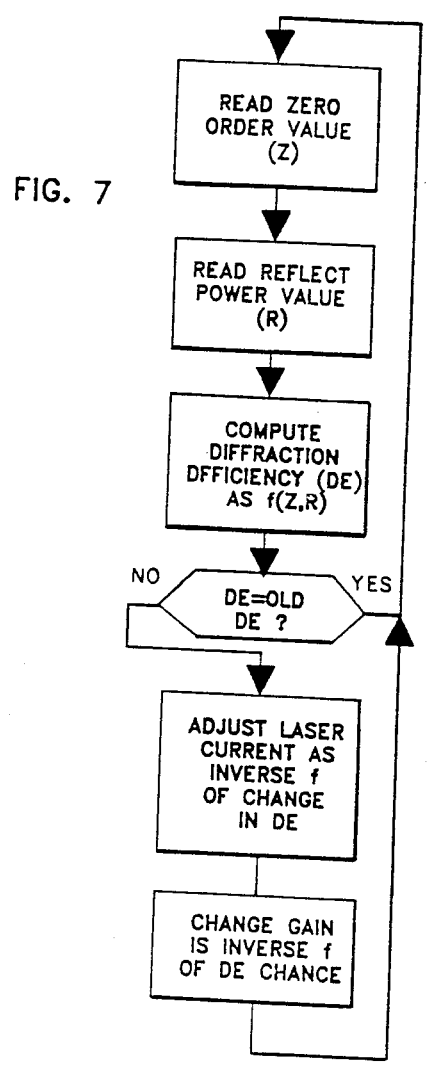
FIG. 7 is a flowchart of operations performed by the power monitor and control system.

FIG. 7 is a flow chart of the operations that are performed by the power control microprocessor 84. The zero order beam levels and the reflected beam levels are read at a fixed frequency which is high enough to be considered as real time. The diffraction efficiency of the active region of the holographic film 12 is determined in accordance with known optical relationships as a function of these beam levels. A check is then made as to whether the diffraction efficiency of the current active region has changed from the last determined value for the diffraction efficiency. If there has been no change, the operating parameters for the scanner are not altered. If, however, the diffraction efficiency has changed, a control signal is generated to change the laser drive current as an inverse function of the change in diffraction efficiency. The drive current is changed by an amount which will cause the power of the first order beam to remain at a relatively constant level. The quantitative change in drive current required is a function of the characteristics of the particular semiconductor laser which is employed.

Concurrently, the gain of video amplifier 74 is incremented or decremented by an amount inversely related to the change in diffraction efficiency. The gain change compensates for any change in the level of the return signal reaching photodetector 76 where that change is the result of diffraction efficiency changes.

The description above assumes that transmissive holograms are used. Reflective holograms can be used to implement the invention. If a reflection hologram is used, the input beam power may be measured using a photodetector at the laser output. The zero order beam would be measured with a photodetector in the path of the reflected, zero order beam. Both photodetectors would be located on the same side of the hologram.

While the invention has been described in the environment of a supermarket scanner, it has other applications. Holographic disks and laser light sources may be used in laser printers. In a laser printing application, the power of the first order beam needs to be maintained at a substantially constant power level. The system disclosed in FIG. 5 can be used for that purpose. The primary difference between the use of that system for a supermarket scanner and for a laser printer is that there is no need to detect and process a returned signal in a laser printer. Photodetector 76 and associated components can be eliminated in a laser printer.

While there have been described what are considered to be preferrred embodiments of the present invention, variations and modifications therein will occur to those skilled in the art once they become acquainted with the basic concepts of the invention. Therefore, it is intended that the appended claims shall be construed to include both the preferred emobodiments and all such variations and modifications as fall within the true spirit and scope of the invention.

We claim:

1. In an optical scanner of the type having a coherent light source and a rotating beam-deflecting component with a plurality of contiguous holographic optical elements for deflecting the coherent light beam along predetermined scan lines, scanner controller means comprising:
    means for monitoring the diffraction efficiency of the holographic optical element in the region currently aligned with the coherent light beam produced by the source; and
    means for adjusting one or more scanner operating parameters as a function of the magnitude of the monitored diffraction efficiency.

2. An optical scanner as defined in claim 1 wherein the diffraction efficiency monitoring means further comprises a photosensitive device located on the opposite side of said beam-deflecting component from said coherent light source for detecting the zero order component of the coherent light beam.

3. An optical scanner as defined in claim 2 wherein said adjusting means comprises means for adjusting the gain factor for at least one component of the scanner.

4. An optical scanner as defined in claim 3 wherein the adjusted component comprises a variable gain video amplifier.

5. An optical scanner as defined in claim 3 wherein the adjusted component comprises a power supply for a variable power laser.

6. In an optical scanner of the type having a variable output coherent light source and a rotating beam deflecting component with a plurality of contiguous holographic optical elements for deflecting the coherent light beam along predetermined scan lines, scanner controller means comprising:
    means for monitoring the diffraction efficiency of the holographic optical element in the region currently aligned with the coherent light beam produced by the source; and
    means for adjusting the output power of the coherent light source as an inverse function of changes in the magnitude of the monitored diffraction efficiency so as to maintain the power of the deflected beam at a substantially constant level.

7. An optical scanner as defined in claim 6 wherein the diffraction efficiency monitoring means further comprises:
    a first photosensitive device located on the opposite side of the beam-deflecting component from said coherent light source for detecting the zero order component of the coherent light beam; and
    a second photosensitive device located on the same side of the beam-deflecting component as said coherent light source for detecting the power of the coherent light beam impinging upon said beam-deflecting component.

8. An optical scanner as defined in claim 7 wherein said second photosensitive device is positioned to receive optical energy reflected from one surface of the beam-deflecting component.

9. An optical scanner as defined in claim 8 wherein the output power adjusting means comprises:
    means for detecting changes in the optical energy level of the zero order component;
    means responsive to the detecting changes for producing an output signal which varies generally proportionally with the zero order component; and
    means responsive to the output signal for varying the power supplied to the coherent light source so as to maintain the first order component of the deflected beam at a constant power level.

10. An optical scanner as defined in claim 9 further including:
    means for detecting optical energy reflected from an object in the path of the first order component;
    means for amplifying the electrical signal produced by said detecting means; and
    means for adjusting the gain of said amplifying means as an inverse function of diffraction efficiency.

11. An optical scanner as defined in claim 10 wherein the gain of said amplifying means is adjusted to provide a relatively constant power signal at the output from said amplifying means.

12. In an optical scanner of the type having a coherent light source, a rotating beam-deflecting component with a plurality of contiguous holographic optical elements for deflecting the coherent light beam along predetermined scan lines and a signal processing system for detecting and processing returned optical signals, means for controlling said signal processing sytem comprising:
    means for monitoring the diffraction efficiency of the holographic optical element at the region currently aligned with the coherent light beam produced by the source; and
    means for controlling the gain of the signal processing system as an inverse function of the magnitude of the monitored diffraction efficiency.

13. An optical scanner as defined in claim 12 wherein the diffraction efficiency monitoring means further comprises a photosensitive device located on the opposite side of said beam deflecting component from said coherent light source for detecting the zero order component of the coherent light beam.

14. An optical scanner as defined in claim 13 further including a variable gain video amplifier within the signal processing system, the gain of said amplifier being adjustable as an inverse function of the magnitude of the monitored diffraction efficiency.

* * * * *